United States Patent
Morikawa

[11] Patent Number: 6,079,381
[45] Date of Patent: Jun. 27, 2000

[54] VALVE-TIMING CONTROLLER FOR AN INTERNAL COMBUSTION ENGINE

[75] Inventor: Junya Morikawa, Toyota, Japan

[73] Assignee: Denso Corporation, Japan

[21] Appl. No.: 09/081,792

[22] Filed: May 20, 1998

[30] Foreign Application Priority Data

May 21, 1997  [JP]  Japan ..................................... 9-131341

[51] Int. Cl.[7] .................................................. F01L 1/34
[52] U.S. Cl. .................................... 123/90.15; 123/90.17; 73/117.2; 73/118.1
[58] Field of Search .............................. 123/90.15, 90.16, 123/90.17; 73/116, 117.2, 117.3, 118.1

[56] References Cited

U.S. PATENT DOCUMENTS

| | | | |
|---|---|---|---|
| 5,033,290 | 7/1991 | Seki et al. | 73/118.1 |
| 5,529,034 | 6/1996 | Sone et al. | 123/90.17 |
| 5,537,961 | 7/1996 | Shigeru et al. | 123/90.15 |
| 5,619,976 | 4/1997 | Kitagawa et al. | 123/679 |
| 5,626,108 | 5/1997 | Kato et al. | 123/90.15 |
| 5,644,073 | 7/1997 | Matsuno et al. | 73/118.1 |
| 5,738,053 | 4/1998 | Kato | 123/90.15 |

FOREIGN PATENT DOCUMENTS

6-21526  3/1994  Japan .

*Primary Examiner*—Weilun Lo
*Attorney, Agent, or Firm*—Nixon & Vanderhye PC

[57] ABSTRACT

A system and method for determining abnormality of a VVT (variable valve-timing control mechanism) and controlling the VVT on consideration of responsiveness thereof. When execution conditions for abnormality determination of the VVT are present, speed of change in angle of rotation ACSPD is calculated on a basis of transition in actual angle of rotation of the VVT as a responsiveness-detection parameter. In the abnormality determination, if the speed of change in angle of rotation ACSPD is less than a programmed determination value, it is determined that followup of VVT operation is faulty, and an abnormality-determination flag XVTFAIL is set to "1" to indicate that some abnormality has occurred. Also, a warning light is placed in an illuminated state. Target relative angle of rotation of the VVT is appropriately established, and VVT operation is suppressed on the basis of this abnormality determination. As a result, drivability and emissions performance degradation can be suppressed.

21 Claims, 7 Drawing Sheets

| NE (rpm) | 800 | 1600 | 2400 | 3200 | 4000 |
|---|---|---|---|---|---|
| (°CA/sec) | | | | | |

FIG. 6B

| THW, THO (°C) | 20 | 30 | 40 | 50 | 60 | 70 | 80 |
|---|---|---|---|---|---|---|---|
| (°CA/sec) | | | | | | | |

FIG. 6C

| TAC (°CA) | 10 | 20 | 30 | 40 | 50 | 60 |
|---|---|---|---|---|---|---|
| (°CA/sec) | | | | | | |

FIG. 6D

| ACD (°CA) | 10 | 20 | 30 | 40 | 50 | 60 |
|---|---|---|---|---|---|---|
| (°CA/sec) | | | | | | |

FIG. 6E

| THW (°C) \ NE (rpm) | 800 | 1600 | 2400 | 3200 | 4000 |
|---|---|---|---|---|---|
| 20 | | | | | |
| 30 | | | | | |
| 40 | | | | | |
| 50 | | | | | |
| 60 | | | | | |
| 70 | | | | | |
| 80 | | | | | |

FIG. 6F (1)

| NE (rpm) | 800 | 1600 | 2400 | 3200 | 4000 |
|---|---|---|---|---|---|
| (°CA/sec) | | | | | |

(2)

| THW, THO (°C) | 20 | 30 | 40 | 50 | 60 | 70 | 80 |
|---|---|---|---|---|---|---|---|
| TEMP. COMP. COEFF. | | | | | | | |

(3)

| TAC (°CA) | 10 | 20 | 30 | 40 | 50 | 60 |
|---|---|---|---|---|---|---|
| TAC | | | | | | |

(4)

| ACD (°CA) | 10 | 20 | 30 | 40 | 50 | 60 |
|---|---|---|---|---|---|---|
| ACD | | | | | | |

VALVE-TIMING CONTROLLER FOR AN INTERNAL COMBUSTION ENGINE

CROSS-REFERENCE TO THE RELATED APPLICATION

This application is based upon and claims priority from Japanese Patent Application No. Hei 9-131341, filed on May 21, 1997, the contents of which are incorporated herein by reference.

DETAILED DESCRIPTION OF THE INVENTION

1. Technical Field of the Invention

The present invention relates to a valve-timing mechanism for an internal combustion engine that is freely variable in accordance with an operating state of opening or closing timing of at least one of either an air-intake valve or an exhaust valve.

2. Related Art

Japanese unexamined patent publication No. Hei 6-21526 discloses a valve-timing controller for an internal combustion engine. In this apparatus, when valve timing of a valve-timing control apparatus does not reach a target value, an abnormality is determined to exist, and the apparatus is fixed at a reference position.

When clogging, leakage or the like exists in an oil passage in a variable valve-timing mechanism, not only may the actual valve timing fail to reach a target value, but responsiveness during driving thereof may be adversely affected. Because the above-described valve-timing controller cannot detect such a delay in responsiveness, drivability and emissions performance may be compromised.

SUMMARY OF THE INVENTION

In this regard, to solve such problems, it is an object of the present invention to provide a valve-timing controller for an internal combustion engine that is capable of determining an abnormality of a variable valve-timing control mechanism on the basis of responsiveness to suppress degradation of drivability and emissions performance by controlling the variable valve-timing control mechanism in consideration of this responsiveness.

In particular, the present invention provides a system and method for determining abnormality of a variable valve-timing control mechanism and for controlling the VVT in response to the detected abnormality. When execution conditions for abnormality determination of the VVT are present, speed of change in angle of rotation ACSPD is calculated on the basis of transition in actual angle of rotation of the VVT as a responsiveness-detection parameter. In the abnormality determination, if the speed of change in angle of rotation ACSPD is less than a programmed determination value, followup of VVT operation is faulty, and an abnormality-determination flag XVTFAIL is set to "1" to indicate that some abnormality has occurred. Also, a warning light is illuminated. Target relative angle of rotation of the VVT is established, and operation of the VVT may be suppressed based on detection of the abnormality. Therefore, the present invention is capable of suppressing drivability and emissions performance degradation.

The above and other objects, features and advantages of the present invention will become more apparent from the following description of embodiments with reference to the accompanying drawings.

DETAILED DESCRIPTION OF THE PREFERRED EMBODIMENTS

Figure 1:
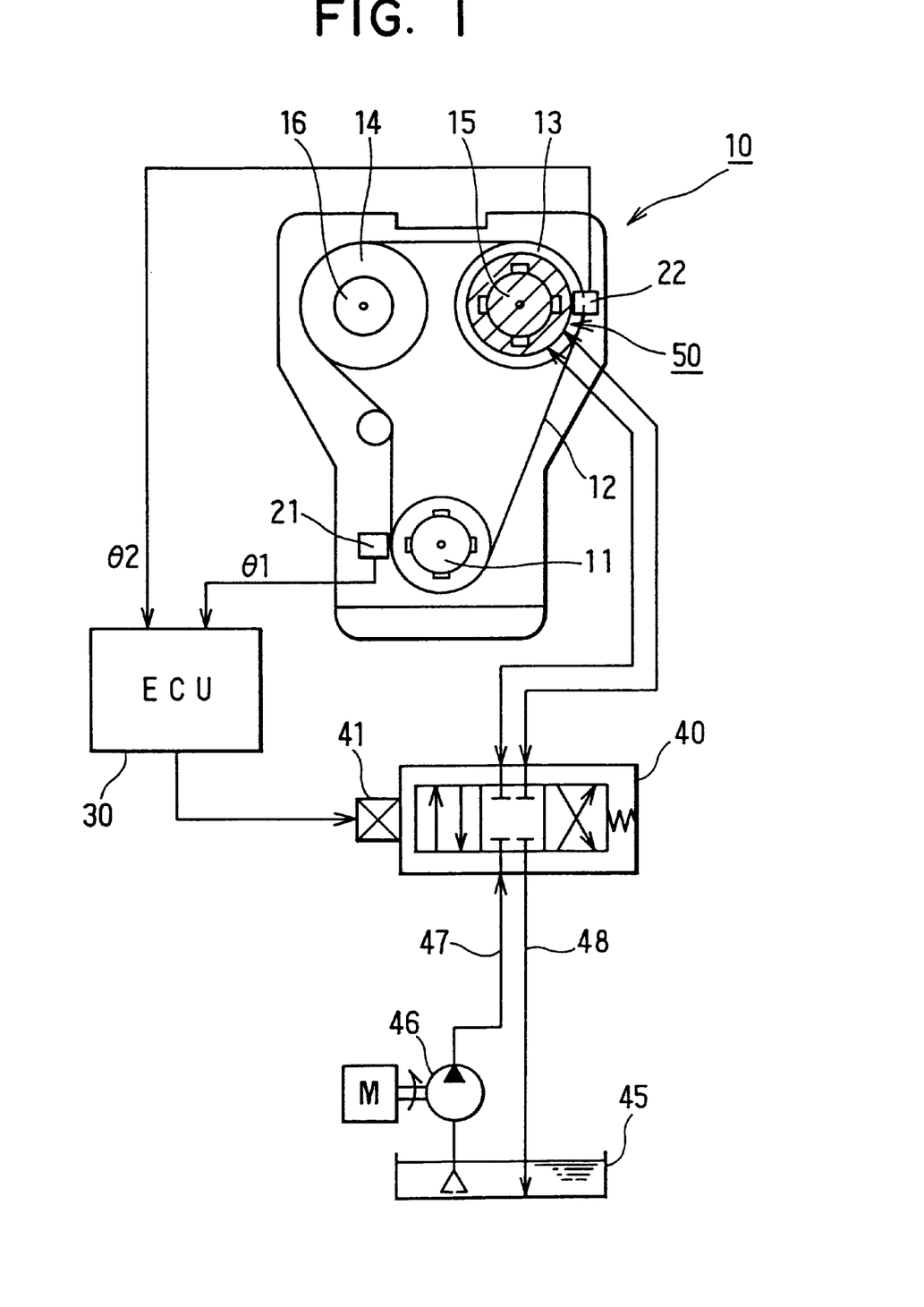
FIG. 1 is a schematic diagram depicting a dual overhead-cam internal combustion engine, and peripheral equipment thereof, employing a valve-timing controller for an internal combustion engine according to a first embodiment of the present invention.

Referring to the drawings, FIG. 1 is a model diagram of a dual overhead-cam internal combustion engine 10, and peripheral equipment thereof, employing a valve-timing controller for an internal combustion engine according to a first embodiment of the present invention. Driving torque is conveyed from a crankshaft 11 via a chain 12 to a pair of chain sprockets 13, 14. A pair of camshafts 15, 16 are disposed as driven shafts on the pair of chain sprockets 13, 14 are rotated in synchronization with this crankshaft 11. These camshafts 15, 16 open and close an air-intake valve and exhaust valve (not illustrated).

A crank-position sensor 21 is disposed on the crankshaft 11, and a cam-position sensor 22 is disposed on the camshaft 15. A pulse signal θ1 output from this crank-position sensor 21 and a pulse signal θ2 output from the cam-position sensor 22 are input to an electronic control unit (ECU) 30.

The ECU 30 is structured as a microprocessor made up of a CPU as a known central processing unit, a ROM to store a control program, a RAM to store various data, a backup RAM, as well as other conventional computer components, and input-output circuits and bus lines connecting these components.

In addition to the above-described signals, various signals, such as an amount of intake air per unit of engine speed (intake-air quantity) GN from an airflow meter (not illustrated) corresponding to an operating state of the internal combustion engine 10, and coolant-water temperature THW from a water-temperature sensor (not illustrated), are input to the ECU 30. Subsequently, a relative angle of rotation AC and target relative angle of rotation TAC of the camshaft 15 with respect to crankshaft 11, which will be described later, are calculated. Additionally, an engine angle of rotation NE is calculated based on the pulse signal Θ1 from the crank-position sensor 21.

Accordingly, a linear solenoid 41 of a spool valve 40 is duty-controlled by a drive signal from the ECU 30 as an oil-flow control valve (OCV). An oil pump 46 pumps oil in an oil tank 45 through a supply-oil passage 47 to a variable valve-timing control mechanism (hereinafter "VVT") 50 (the slanted-line portion of FIG. 1) disposed on one camshaft 15. Through adjustment of the amount of oil supplied to this VVT 50 the camshaft 15 rotates freely, having a predetermined phase differential with respect to the chain sprocket 13. That is to say, the crankshaft 11 and the camshaft 15 can be set at the target relative angle of rotation TAC. Further, oil from the VVT 50 passes through a discharge oil passage 48 and returns to the oil tank 45.

Herein, when the crankshaft 11 rotates once and a number of pulses equal to N is generated from the crank-position sensor 21, the number of pulses from the cam-position sensor 25 with one rotation of the camshaft 15 is equal to N. Additionally, when the timing conversion angle maximum value of the camshaft 15 is taken to be Θmax ° CA (crank angle), the number of pulses N is established so that N<(360/Θmax). Because of this, the pulse signal Θ1 of the crank-position sensor 21 and the pulse signal Θ2 of the cam-position sensor 22 generated in succession to this pulse signal Θ1 can be employed when calculating the relative angle of rotation AC.

Figure 2:
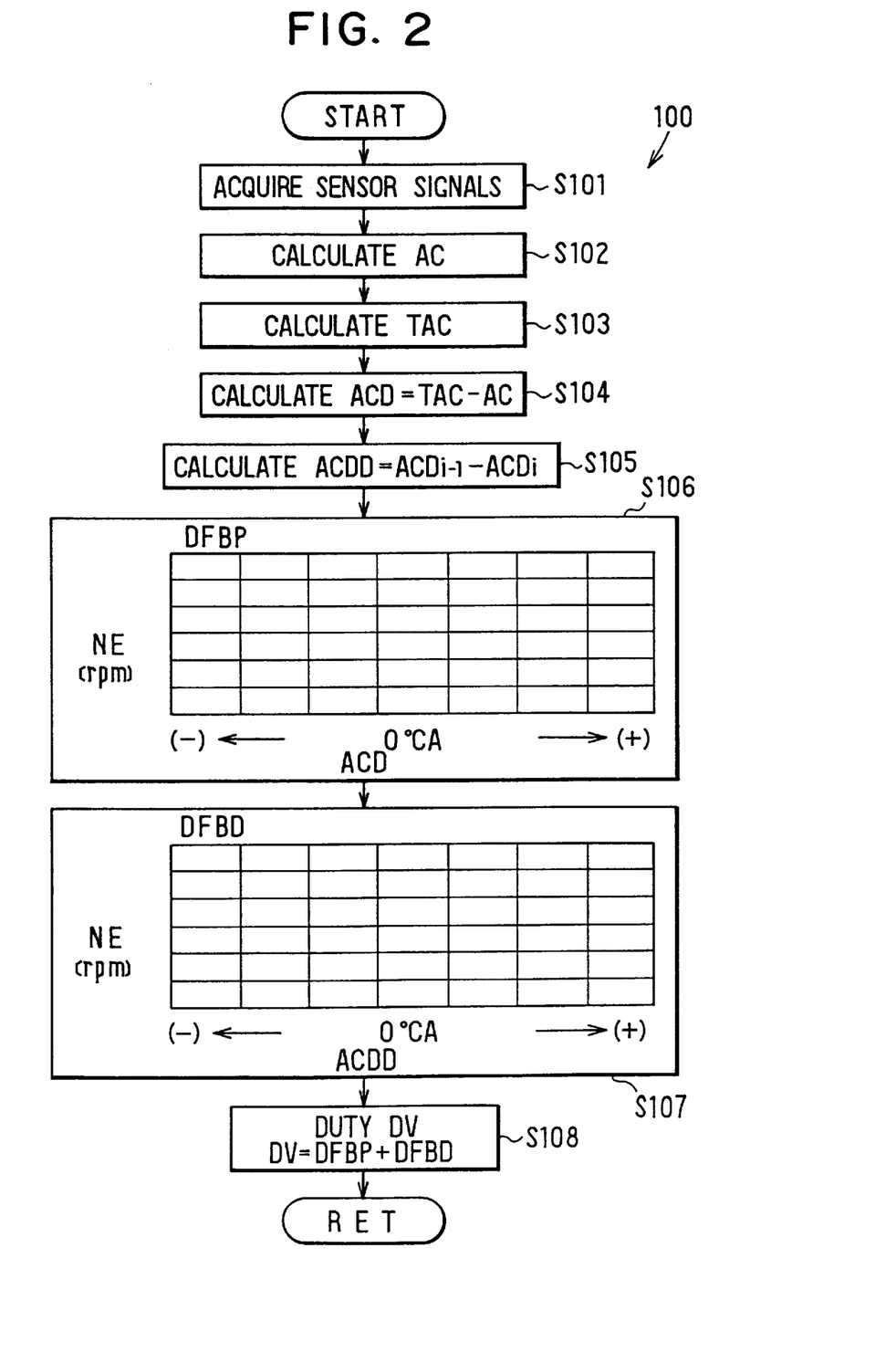
FIG. 2 is a flow diagram indicating processing steps of VVT control in an ECU employed in the valve-timing controller for an internal combustion engine according to the first embodiment of the present invention.
Figure 3:
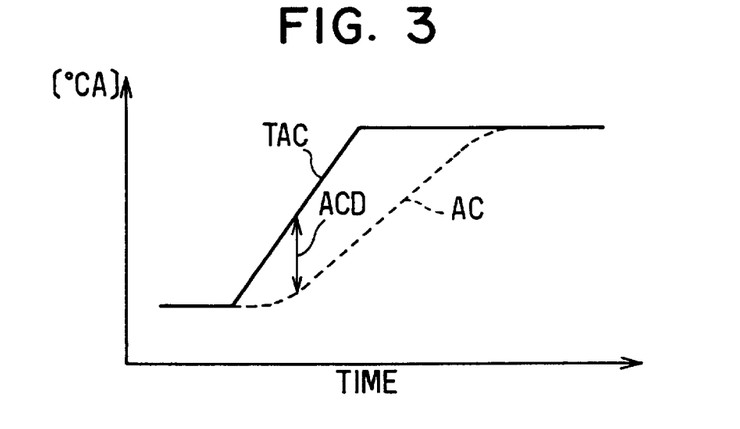
FIG. 3 is a timing diagram indicating transitional states of angle of rotation deviation in FIG. 2.

Next, processing steps of VVT control of the ECU 30 employed in the valve-timing controller for an internal combustion engine according to the first embodiment of the present invention will be described with reference to FIG. 3 based on the flow diagram 100 of FIG. 2 showing these processing steps. Here, FIG. 3 is a timing diagram showing the transitional state of an angle of rotation deviation ACD between the actual relative angle of rotation AC and the target relative angle of rotation TAC. The ECU 30 repeats execution of this VVT processing routine once every predetermined time interval.

In FIG. 2, firstly, in step S101, signals, including the output signal θ1 of the crank-position sensor 21, the output signal θ2 of the cam-position sensor 22, the engine speed NE and intake-air quantity GN indicating the operating state of the internal combustion engine 10 are acquired as the various sensor signals. Next, execution advances to step S102, and the relative angle of rotation AC (=Θ1−Θ2) which is the present phase differential of the camshaft 15 with respect to the crankshaft 11 is calculated from the output signal θ1 of the crank-position sensor 21 and the output signal θ2 of the cam-position sensor 22.

Execution then advances to step S103, and the target relative angle of rotation TAC, which is the present target phase differential, is calculated, as will be described later. Execution then advances to step S104, and the angle of rotation deviation ACD (=TAC−AC) is calculated on a basis of the relative angle of rotation AC calculated in step S102 and the target relative angle of rotation TAC calculated in step S103 (refer to FIG. 3). Execution then advances to step S105, and an angle of rotation deviation differential ACDD (=ACDi−1−ACDi) is calculated as amount of change per unit of time in the angle of rotation differential ACD. Here, ACDi−1 is the previous angle of rotation deviation, and ACDi is the present angle of rotation deviation.

Execution then advances to step S106, and a proportional term DFBP for compensating feedback is calculated on a basis of the engine speed NE (rpm) acquired in step S101 and the angle of rotation deviation ACD (° CA) calculated in step S104. Execution then advances to step S107, and a differential term DFBD for compensating feedback is calculated on a basis of the engine speed NE (rpm) acquired in step S101 and the angle of rotation deviation differential ACDD (° CA) calculated in step S105.

Execution then advances to step S108, and a control duty (duty ratio) DV to output to the linear solenoid 41 of the spool valve 40 is calculated according to the following expression (1) on a basis of the proportional term DFBP for compensating feedback calculated in step S106 and the differential term DFBD for compensating feedback calculated in step S107. Thereafter, this routine ends.

[Equation 1]

$$DV = DFBP + DFBD \tag{1}$$

Figure 4:
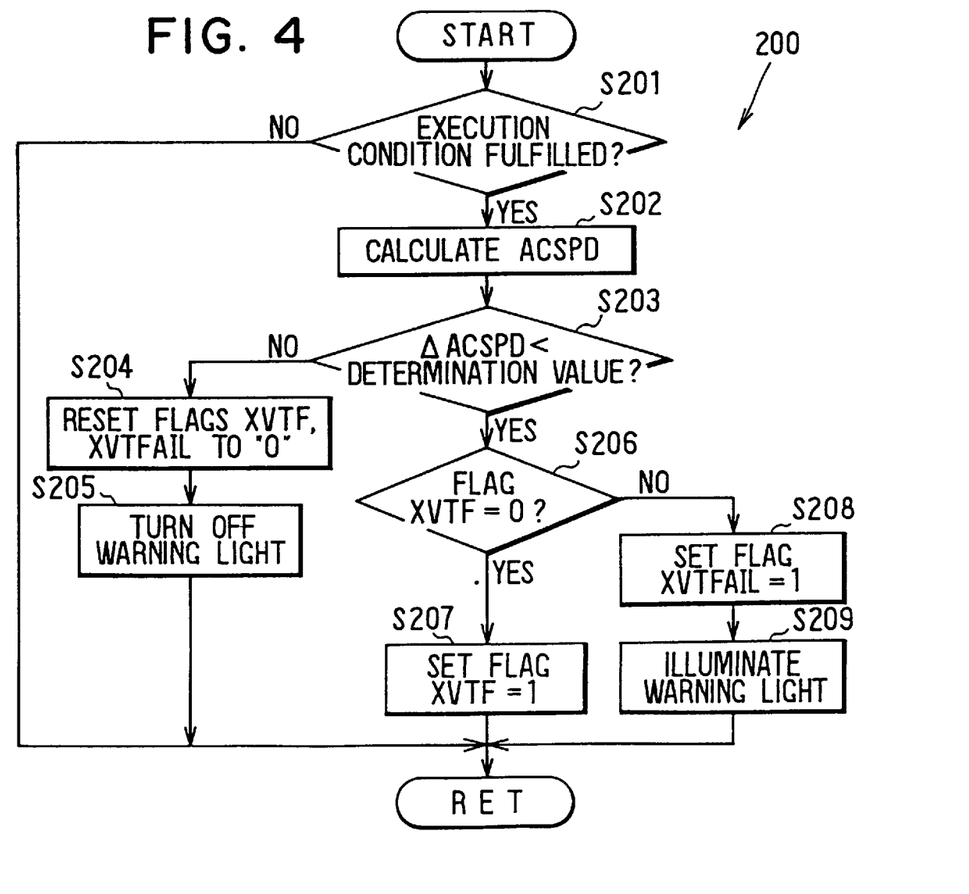
FIG. 4 is a flow diagram indicating processing steps of abnormality determination in the ECU employed in the valve-timing controller.
Figure 5:
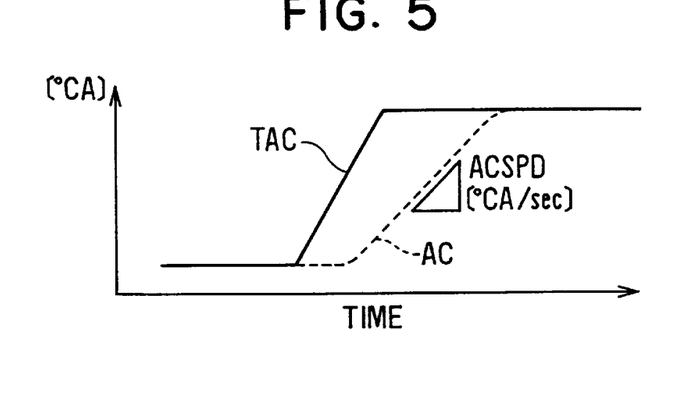
FIG. 5 is an explanatory drawing depicting speed of change in angle of rotation as a responsiveness-detection parameter in FIG. 4.

Next, processing steps for determining abnormality of the ECU 30 employed in the valve-timing controller for an internal combustion engine according to the first embodiment of the present invention will be described with reference to FIG. 5 based on the flow diagram 200 of FIG. 4 showing these processing steps. Here, FIG. 5 is an explanatory diagram indicating a responsiveness-detection parameter. The ECU 30 repeats execution of this abnormality-determining routine once every predetermined time interval.

In FIG. 4, firstly, in step S201, it is determined whether an execution condition for abnormality determination has been fulfilled. Here, for example, the execution condition for abnormality determination is taken to be fulfilled when oil is stable with engine speed NE at 1,600 rpm or more, oil viscosity is appropriate with coolant-water temperature THW or oil temperature at 40° C. or more, the amount of change in the target relative angle of rotation TAC is a large 10° CA, and the angle of rotation deviation ACD is a large 7.5° CA. When the determination condition of step S201 is not fulfilled, no further processing occurs, and this routine ends.

Meanwhile, when the determination condition of step S201 is fulfilled, execution advances to step S202. At step 202, the speed of change in angle of rotation ACSPD (° CA/sec), shown as the slope in FIG. 5, is calculated, for example, as a responsiveness-detection parameter. Execution then advances to step S203, and abnormality determination is executed according to whether the speed of change in angle of rotation ACSPD is less than a previously established determination value. Establishment of the determination value employed in step S203 will be described later. When the determination condition of step S203 is not fulfilled and the speed of change in angle of rotation ACSPD is the determination value or more, followup performance of the operation of the VVT 50 is favorable. Therefore, execution advances to step S204, where a provisional abnormality flag XVTF and an abnormality-determination flag XVT-FAIL are both reset to "0." Execution then advances to step S205, a warning light is placed in a nonilluminated state, and this routine ends.

Meanwhile, when the determination condition of step S203 is fulfilled and the speed of change in angle of rotation ACSPD is less than the determination value, the followup performance of the operation of the VVT 50 is not favorable. Therefore, execution advances to step S206, and it is determined whether the provisional abnormality flag XVTF is "0." When the determination condition of step S206 is fulfilled, execution advances to step S207 and the provisional abnormality flag XVTF is set to "1," and thereafter this routine ends. Herein, when the determination condition of step S206 is not fulfilled and the provisional abnormality flag XVTF is already "1," execution advances to step S208 and the abnormality-determination flag XVTFAIL is set to "1" to indicate that an abnormality actually has occurred. Execution then advances to step S209, a warning light is placed in an illuminated state, and this routine ends.

Establishment of the determination value employed in the abnormality determination of step S203 for the speed of change in angle of rotation ACSPD (° CA/sec) as the responsiveness-detection parameter calculated in the above-described step S202 will be described next with reference to the various maps, indicated generally at 300 in FIG. 6. Here, the several determination values established in the various maps of FIG. 6 may be employed independently or in combination. Further, the intermediate values in the various maps of FIG. 6 are calculated by interpolation.

Figure 6A:
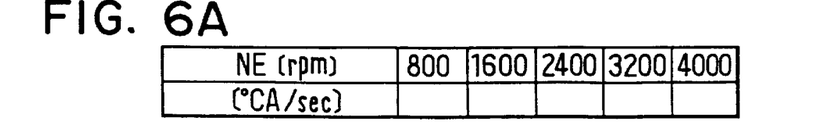
FIG. 6 shows a variety of maps establishing determination values in FIG. 4.

In FIG. 6A, the determination value (° CA/sec) in abnormality determination is established with the engine speed NE (rpm) of the internal combustion engine 10 as the parameter. The determination value at this time is initially set, and increases as the engine speed NE increases.

Figure 6B:
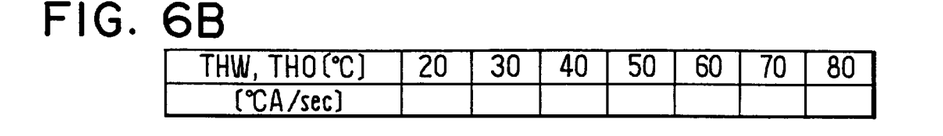

In FIG. 6B, the determination value (° CA/sec) in abnormality determination is established with the coolant-water temperature THW (° C.) of the internal combustion engine 10 or the oil temperature THO (° C.) of the hydraulic oil of the VVT 50 as the parameter. The determination value at this time is initially set, and increases as the coolant-water temperature THW or the oil temperature THO increases.

Figure 6C:
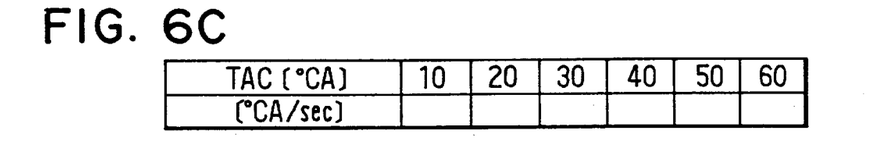

In FIG. 6C, the determination value (° CA/sec) in abnormality determination is established with the target relative angle of rotation TAC amount of change (° CA) of the VVT 50 as the parameter. The determination value at this time is initially set, and increases as the target relative angle of rotation TAC amount of change increases.

Figure 6D:
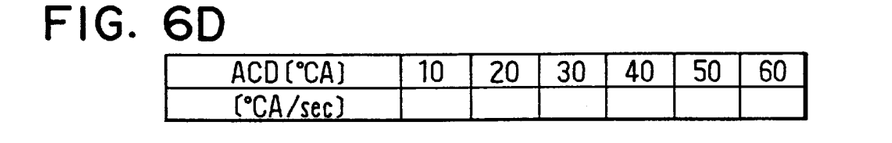

In FIG. 6D, the determination value (° CA/sec) in abnormality determination is established with the initial angle of rotation deviation ACD (° CA) of the VVT 50 as the parameter. The determination value at this time is initially set, and increases as the initial angle of rotation deviation ACD increases.

Figure 6E:
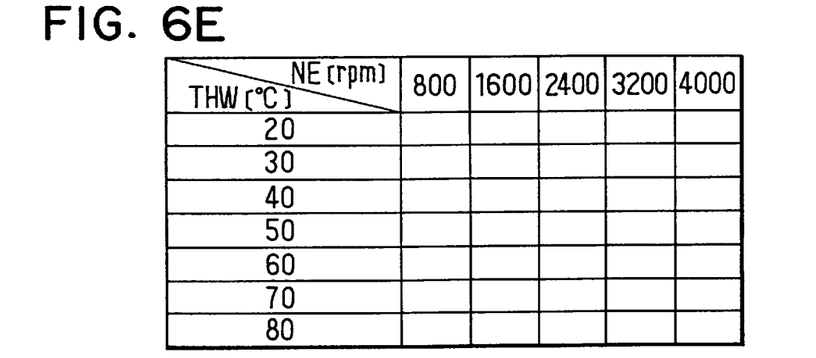
Figure 6F:
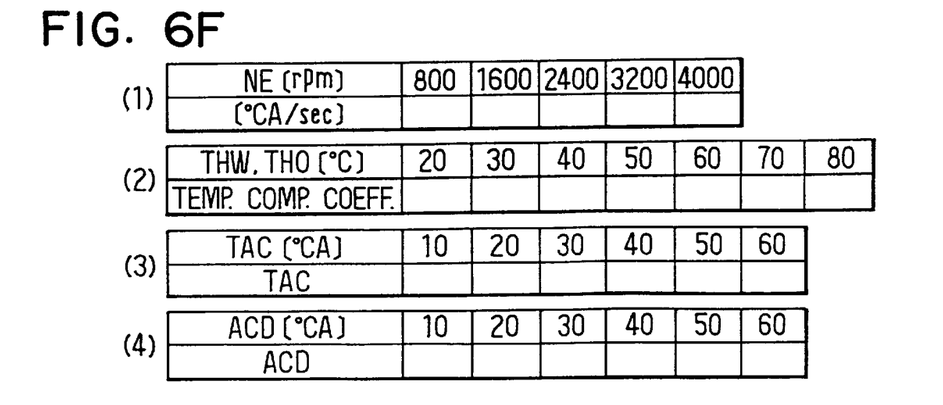

In FIG. 6E, the determination value (° CA/sec) in abnormality determination is established with the engine speed NE (rpm) and the coolant-water temperature THW (° C.) of the internal combustion engine 10 as the parameters. The determination value at this time is initially set, and increases as the engine speed NE and the coolant-water temperature THW increases.

Further, in FIG. 6E, the determination value (° CA/sec) in abnormality determination is established by multiplying a basic determination value by respective compensation coefficients. That is to say, the determination value at this time is established by taking a basic determination value (° CA/sec) established with the engine speed NE (rpm) of the internal combustion engine 10 as a parameter (refer to FIG. 6F -(1)) and multiplying by a temperature compensation coefficient established with the coolant-water temperature THW (° C.) of the internal combustion engine 10 or the oil temperature THO (° C.) of the hydraulic oil of the VVT 50 as the parameter (refer to FIG. 6F -(2)), multiplying by a TAC compensation coefficient established with the target relative angle of rotation TAC amount of change (° CA) of the VVT 50 as the parameter (refer to FIG. 6F-(3)), and also multiplying by an ACD compensation coefficient established with the initial angle of rotation deviation ACD (° CA) of the VVT 50 as the parameter (refer to FIG. 6F -(4)). The basic determination value and the several compensation coefficients are initially set, and increases as the parameter becomes larger.

Figure 7:
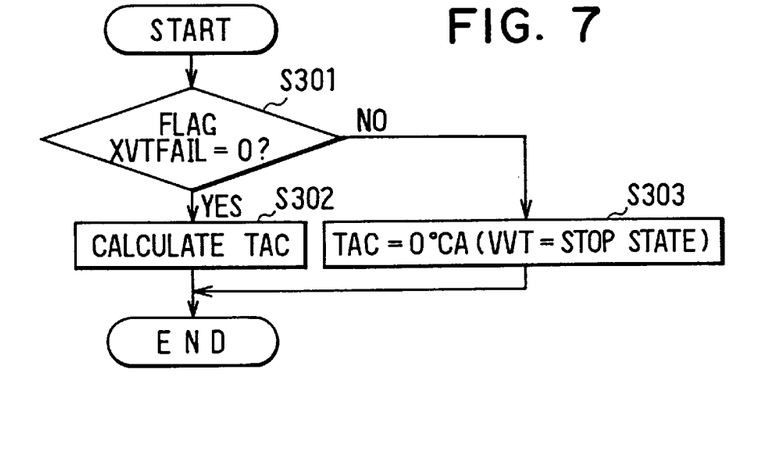
FIG. 7 is a flow diagram indicating processing steps of calculation of a target relative angle of rotation in the ECU employed in the valve-timing controller of the present invention.
Figure 8:
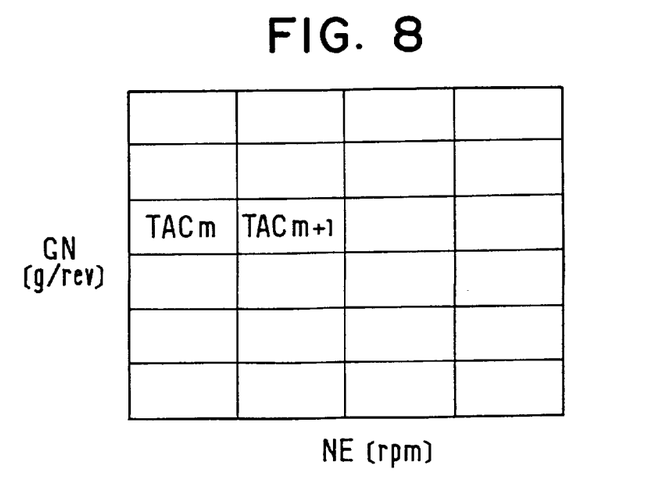
FIG. 8 shows a map used to calculate the target relative angle of rotation in FIG. 7.

Next, processing steps for calculating the target relative angle of rotation of the ECU 30 employed in the valve-timing controller for an internal combustion engine according to the first embodiment of the present invention will be described with reference to FIG. 8 based on the flow diagram of FIG. 7 showing these processing steps. Here, FIG. 8 is a map to calculate the target relative angle of rotation TAC (° CA) with the engine speed NE (rpm) and the intake-air quantity GN (g/rev) as parameters. The ECU 30 repeats execution of this routine to calculate the target relative angle of rotation once every predetermined time interval, thus calculating the target relative angle of rotation TAC in the above-described step S103 of FIG. 2.

In FIG. 7, in step S301 it is determined whether the abnormality-determination flag XVTFAIL is "0." When the determination condition of step S301 is fulfilled and the abnormality-determination flag XVTFAIL is "0" and no abnormality has occurred, execution advances to step S302 and the target relative angle of rotation TAC (° CA) is calculated from the engine speed NE (rpm) and the intake-air quantity GN (g/rev—refer to FIG. 8), and this routine ends. Meanwhile, when the determination condition of step S301 is not fulfilled and the abnormality-determination flag XVTFAIL is "1" and an abnormality has occurred, execution advances to step S303 and the target relative angle of rotation TAC is caused to be 0 (° CA), that is to say, the VVT 50 is caused to assume a stopped state, and this routine ends.

Figure 9:
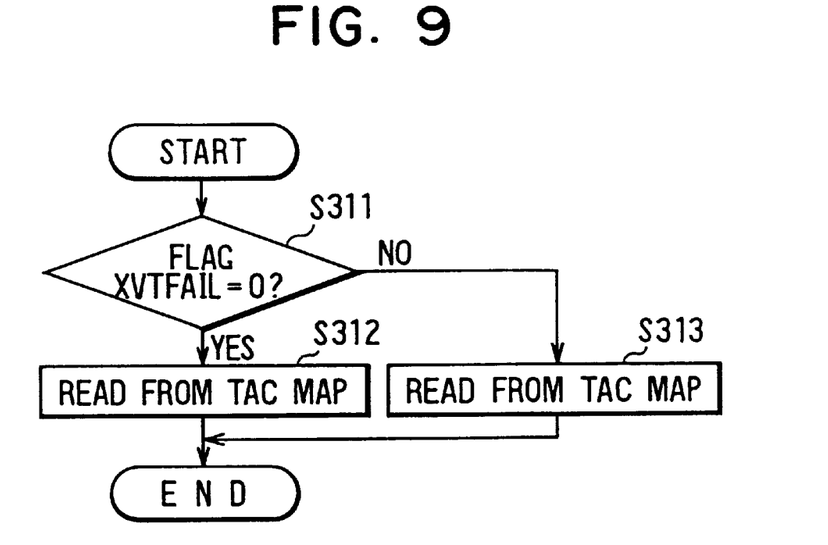
FIG. 9 is a flow diagram indicating a modification of processing steps of calculation of a target relative angle of rotation in the ECU employed in the valve-timing controller of the present invention.

Next, a modification of processing steps for calculating the target relative angle of rotation of the ECU 30 employed in the valve-timing controller for an internal combustion engine according to the first embodiment of the present invention will be described with reference to FIG. 8 based on the flow diagram of FIG. 9 showing these processing steps. The ECU 30 repeats execution of this modification of a routine to calculate the target relative angle of rotation once every predetermined time interval, thus calculating the target relative angle of rotation TAC in the above-described step S103 of FIG. 2.

In FIG. 9, in step S311 it is determined whether the abnormality-determination flag XVTFAIL is "0." When the determination condition of step S311 is fulfilled and the abnormality-determination flag XVTFAIL is "0" and no abnormality has occurred, execution advances to step S312 and the target relative angle of rotation TAC (° CA) is calculated from the engine speed NE (rpm) and the intake-air quantity GN (g/rev—refer to FIG. 8), and this routine ends. Meanwhile, when the determination condition of step S311 is not fulfilled and the abnormality-determination flag XVTFAIL is "1" and an abnormality has occurred, execution advances to step S313 and the target relative angle of rotation TAC (° CA) is calculated, for example, from a TAC map that is used at a time of abnormality, and that is established to be proportionately smaller than the map shown in FIG. 8. Thereafter, the routine ends.

Figure 10:
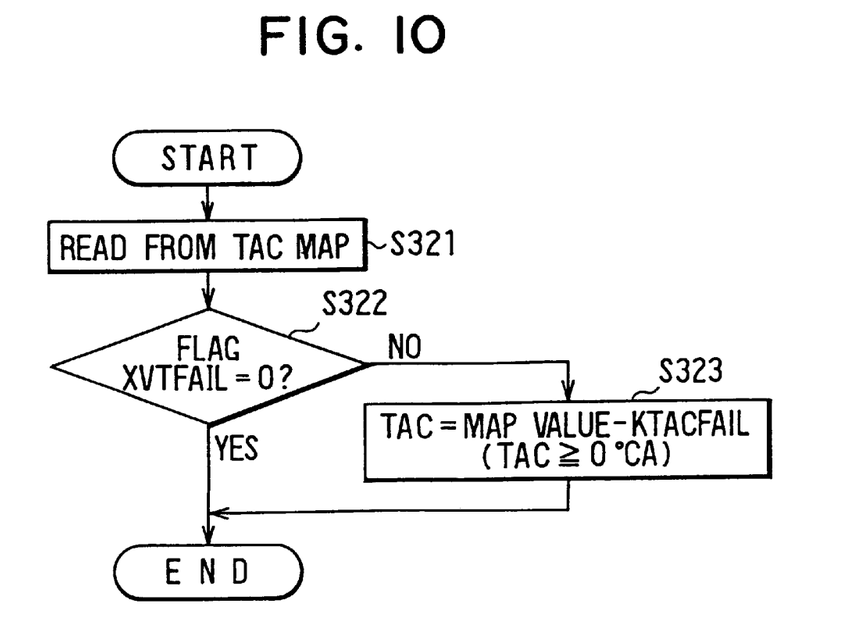
FIG. 10 is a flow diagram indicating another modification of processing steps of calculation of a target relative angle of rotation in the ECU employed in the valve-timing controller of the present invention.
Figure 11:
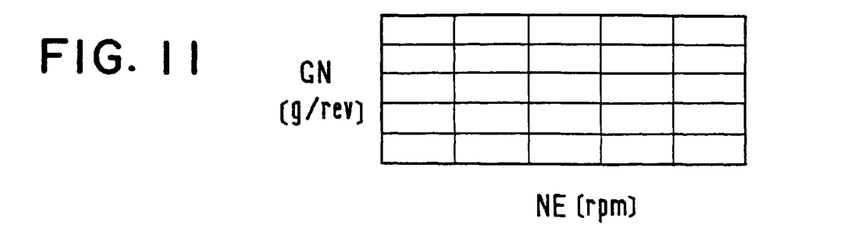
FIG. 11 shows a map used to calculate a TAC compensation value during abnormality in FIG. 10.

Next, another modification of processing steps for calculating the target relative angle of rotation of the ECU 30 employed in the valve-timing controller for an internal combustion engine according to the first embodiment of the present invention will be described with reference to FIG. 8 and FIG. 11, based on the flow diagram of FIG. 10 showing these processing steps. Here, FIG. 11 shows a TAC compensation value during abnormality KTACFAIL (° CA), with the engine speed NE (rpm) and the intake-air quantity GN (g/rev) as parameters. The ECU 30 repeats execution of this other modification of a routine to calculate the target relative angle of rotation once every predetermined time interval, thus calculating the target relative angle of rotation TAC in the above-described step S103 of FIG. 2.

In FIG. 10, in step S321, the target relative angle of rotation TAC is calculated from the engine speed NE (rpm) and the intake-air quantity GN (g/rev—refer to FIG. 8). Execution then advances to step S322, and it is determined whether the abnormality-determination flag XVTFAIL set in FIG. 4 is "0." When the determination condition of step S321 is fulfilled and the abnormality-determination flag XVTFAIL is "0" and no abnormality has occurred, this routine ends. Meanwhile, when the determination condition of step S321 is not fulfilled and the abnormality-determination flag XVTFAIL is "1", and an abnormality has occurred, execution advances to step S323, the TAC compensation value during abnormality KTACFAIL is subtracted from the map value of the target relative angle of rotation TAC to determine the target relative angle of rotation TAC during an abnormality, and this routine ends. Here, the target relative angle of rotation TAC during an abnormality is 0φ CA or more. The TAC compensation value during abnormality KTACFAIL (° CA) is, for example, established at a fixed value of 30° CA, or is determined from the map shown in FIG. 11 with the engine speed NE (rpm) and the intake-air quantity GN (g/rev) as parameters.

It may be noted that in the foregoing embodiments, the speed of change in angle of rotation ACSPD is calculated as the responsiveness-detection parameter in step S202 of the abnormality-determination routine in FIG. 4, and is employed in the abnormality determination at step S203. However, the present invention is not exclusively restricted thereto, and can employ a parameter directly indicating responsiveness of the relative angle of rotation AC which tracks and experiences transition from the target relative angle of rotation TAC as a responsiveness-detection parameter.

Figure 12:
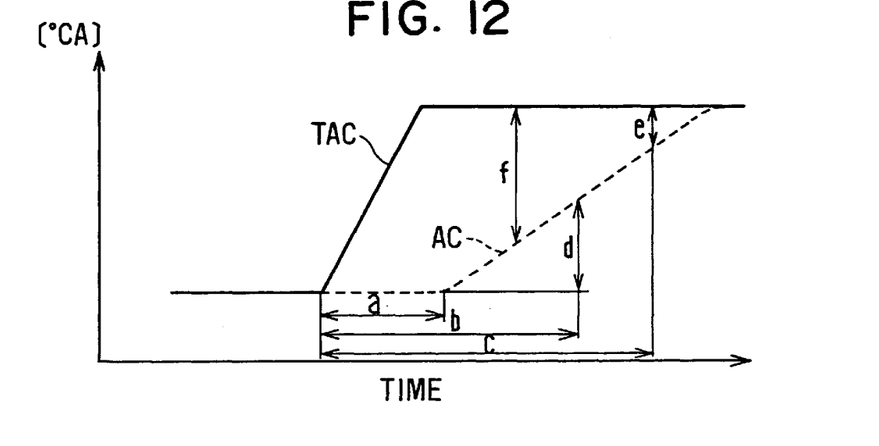
FIG. 12 is an explanatory drawing depicting other direct values as responsiveness-detection parameters in FIG. 4.

That is to say, as shown in FIG. 12, a—response delay time of the relative angle of rotation AC, b—required time until the relative angle of rotation AC becomes a predetermined value, c—required time until the angle of rotation deviation ACD becomes a predetermined value, d—angle of rotation AC amount of change during required time b, e—angle of rotation deviation ACD during required time c, or f—angle of rotation deviation ACD changing speed, may be employed.

Figure 13:
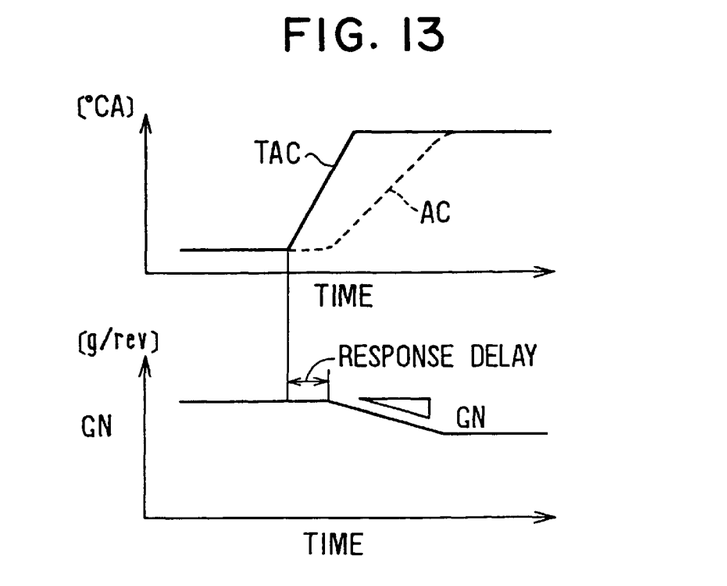
FIG. 13 is an explanatory drawing depicting other indirect values as responsiveness-detection parameters in FIG. 4.

Additionally, change in operating state of the internal combustion engine 10 accompanying change in the relative angle of rotation AC may be employed as the responsiveness-detection parameter. That is to say, for example, intake-air quantity GN changing speed, indicated as response delay or slope of intake-air quantity GN to the internal combustion engine in FIG. 13, can be employed as a parameter indirectly indicating responsiveness of the relative angle of rotation AC. Further, intake-air pressure or filling efficiency also can be employed, similarly to intake-air quantity GN, as a parameter indirectly indicating responsiveness of the relative angle of rotation AC.

In this way, the valve-timing controller for an internal combustion engine according to this embodiment comprises the VVT 50 disposed in the driving-torque transmission system including the chain 12, to transmit driving torque from the crankshaft 11 to the camshaft 15 to open and close the air-intake valve and freely rotating relative to the camshaft 15 within a predetermined angular range, a device for detecting responsiveness of the VVT 50 or of change in an operating state of the internal combustion engine 10 accompanying operation of the VVT 50, and a device achieved by the ECU 30 for determining abnormality in the VVT 50 on a basis of responsiveness detected by the responsiveness-detecting device.

Consequently, abnormality in the VVT 50 is determined by the ECU 30 on a basis of a parameter indicating responsiveness, or by change in operating state of the internal combustion engine 10 accompanying operation thereof detected by the ECU 30 when the relative angle of rotation AC tracks the target relative angle of rotation TAC and experiences transition in the VVT 50. Because of this, it can accurately be determined that some abnormality has occurred in the VVT 50 when there is worsening in responsiveness when the relative angle of rotation AC reaches the target relative angle of rotation TAC in the VVT 50, and degradation of drivability and emissions performance can be suppressed.

Additionally, with the valve-timing controller for an internal combustion engine according to this embodiment, the abnormality-determining device achieved by the ECU 30 establishes a determination value for abnormality in the VVT 50 in correspondence with at least one of the following parameters among engine speed NE or coolant-water temperature THW of the internal combustion engine 10, an amount of change in target relative angle of rotation TAC of the VVT 50, or angle of rotation deviation ACD between actual relative angle of rotation AC and target relative angle of rotation TAC of the VVT 50.

Consequently, the determination value for determining abnormality in the VVT 50 with the ECU 30 achieving the abnormality-determining device is specifically established in correspondence with at least one of the values relating to the operating state of the internal combustion engine 10 or to the VVT 50, and is compared with a parameter indicating responsiveness detected by the ECU 30 achieving the responsiveness-detecting device. In this way, the determination value for abnormality determination is established utilizing the several signals ordinarily employed in the internal combustion engine 10 wherein the VVT 50 is mounted, and so structural complexity does not increase.

Accordingly, with the valve-timing controller for an internal combustion engine according to this embodiment, the abnormality-determining device achieved by the ECU 30 prohibits determination of an abnormality in the VVT 50 when at least one condition has been fulfilled among a time when engine speed NE or coolant-water temperature THW of the internal combustion engine 10 is low, a time when an amount of change in target relative angle of rotation TAC of the VVT 50 is small, or a time when angle of rotation deviation ACD between actual relative angle of rotation AC and target relative angle of rotation TAC of the VVT 50 is small. That is to say, abnormality determination of the VVT 50 by the ECU 30 achieving the abnormality-determining device is prohibited when an operating-state change of the internal combustion engine 10 is small, or an amount of change relating to the VVT 50 is small. Owing to this, determination can be made accurately because abnormality determination is performed solely when both the internal combustion engine 10 and the VVT 50 fulfill conditions suited to abnormality determination of the VVT 50.

Moreover, with the valve-timing controller for an internal combustion engine according to this embodiment, the abnormality-determining device achieved by the ECU 30 suppresses operation of the VVT 50 when an abnormality has been detected. That is to say, the VVT 50 cannot operate normally when determined to be abnormal by the ECU 30 achieving the abnormality-determining device, and so operation is suppressed in correspondence to the extent of the abnormality. In this way, the VVT 50 is controlled in consideration of responsiveness and worsening of drivability and emissions can be suppressed.

Still further, with the valve-timing controller for an internal combustion engine according to this embodiment, the responsiveness-detecting device achieved in the ECU 30 detects responsiveness directly or indirectly. That is to say, the ECU 30 achieving the responsiveness-detecting device detects responsiveness of the VVT 50 directly from amount of change thereof or indirectly on a basis of change in the operating state of the internal combustion engine 10 accompanying operation of the VVT 50. In this way, responsiveness of the VVT 50 is detected utilizing the several signals ordinarily employed in the internal combustion engine 10 wherein the VVT 50 is mounted, and so structural complexity does not increase.

In the above embodiment, the present invention is applied to an internal combustion engine comprising a phase variable type VVT. However, the present invention may also be applied to a variable lift amount type VVT which controls the lift amount of an exhaust gas suction valve or an internal combustion engine comprising a phase and lift amount variable type VVT.

What is claimed is:

1. A valve-timing system for an internal combustion engine, comprising:
    a variable valve-timing control mechanism disposed in a driving-torque transmission system to transmit driving torque from a driveshaft of an internal combustion engine to a driven shaft to open or close at least one of an air-intake valve or exhaust valve, and that freely rotates relative to either said driveshaft or said driven shaft within a predetermined angular range;
    a controller that is operative to detect responsiveness of said variable valve-timing control mechanism, or of change in an operating state of said internal combustion engine accompanying operation of said variable valve-timing control mechanism, the controller also being operative to determine abnormality in said variable valve-timing control mechanism on a basis of the detected responsiveness of said variable valve-timing control mechanism,
    wherein said controller is operative to:
        determine a present relative angle of rotation term AC between the driving shaft and the driven shaft;
        determine a target relative angle of rotation term TAC based on predetermined variables;
        determine an angle of rotation deviation term ACD based on the AC term and the TAC term; and
        determine a deviation in the relative angle of rotation term ACDD based on the present ACD term and a past ACD term;
    the controller utilizing the above terms to control operation of the valve timing control mechanism,
    wherein said controller is further operative to:
        determine a proportional term DFBP for compensating feedback based on the engine speed and the term ACD;
        determine a differential deviation term DFBD for compensating feedback based on the engine speed and the term ACDD; and
        control the variable valve timing control mechanism based on the DFBP and DFBD terms.

2. A valve-timing controller for an internal combustion engine according to claim 1, wherein said controller is operative to:
    determine if test conditions exist;
    determine a responsiveness parameter that indicates a speed of change in the relative angle of rotation; and
    determine if an operating abnormality exists based on the responsiveness parameter.

3. A valve-timing controller for an internal combustion engine according to claim 2, wherein said controller is operative to:
    determine if the responsiveness parameter is less than a predetermined value;
    reset provisional abnormality and abnormality-determination flags to "0" if the responsiveness parameter is not less than the predetermined value;
    determine if the provisional abnormality flag is "0" if the responsiveness parameter is less than the predetermined value;
    generate a warning signal if the provisional abnormality flag is not "0"; and
    set the abnormality-determination flag to "1" if the provisional abnormality flag is "0".

4. A valve-timing controller for an internal combustion engine according to claim 3, wherein said controller is operative to set the predetermined value from mapped values based on engine operating parameters.

5. A valve-timing controller for an internal combustion engine according to claim 3, wherein said controller is operative to:
    calculate the term TAC from measured engine speed and intake air quantity parameters when the abnormality-determination flag is "0"; and
    suppress operation of the variable valve-timing control mechanism when the abnormality-determination flag is "1".

6. A valve-timing controller for an internal combustion engine according to claim 3, wherein said controller is operative to:
    calculate the term TAC from measured engine speed and intake air quantity parameters when the abnormality-determination flag is "0"; and
    calculate the term TAC from a map when the abnormality-determination flag is "1" so that the term TAC is smaller in value than if the abnormality-determination flag was "0".

7. A valve-timing controller for an internal combustion engine according to claim 3, wherein said controller is operative to:
    calculate the term TAC from measured engine speed and intake air quantity parameters;
    determine if the abnormality-determination flag is "0"; and
    calculate the term TAC when the abnormality-determination flag is "1" by subtracting a predetermined compensation value from a mapped TAC value.

8. A valve-timing controller for an internal combustion engine, comprising:
    a variable valve-timing control mechanism that is disposed in a driving-torque transmission system to transmit driving torque from a driveshaft of an internal combustion engine to a driven shaft to open or close at least one of an air-intake valve or exhaust valve, and that freely rotates relative to either said driveshaft or said driven shaft within a predetermined angular range;

means for detecting responsiveness of said variable valve-timing control mechanism or of change in an operating state of said internal combustion engine accompanying operation of said variable valve-timing control mechanism; and means for determining abnormality in said variable valve-timing control mechanism on a basis of responsiveness detected by said responsiveness-detecting means, wherein said responsiveness detecting means is operative to:

determine a present relative angle of rotation term AC between the driving shaft and the driven shaft;

determine a target relative angle of rotation term TAC based on predetermined variables;

determine an angle of rotation deviation term ACD based on the AC term and the TAC term; and determine a deviation in the relative angle of rotation term ACDD based on the present ACD term and a past ACD term;

the above terms being used to control operation of the valve timing control mechanism, wherein said responsiveness detecting means is further operative to:

determine a proportional term DFBP for compensating feedback based on engine speed and the term ACD;

determine a differential deviation term DFBD for compensating feedback based on the engine speed and the term ACDD; and control the variable valve timing control mechanism based on the DFBP and DFBD terms.

9. A valve-timing controller for an internal combustion engine according to claim 8, wherein the abnormality determining means is operative to:

determine if test conditions exist;

determine a responsiveness parameter that indicates a speed of change in the relative angle of rotation; and determine if an operating abnormality exists based on the responsiveness parameter.

10. A valve-timing controller for an internal combustion engine according to claim 9, wherein the abnormality determining means is operative to:

determine if the responsiveness parameter is less than a predetermined value;

reset provisional abnormality and abnormality-determination flags to "0" if the responsiveness parameter is not less than the predetermined value;

determine if the provisional abnormality flag is "0" if the responsiveness parameter is less than the predetermined value;

generate a warning signal if the provisional abnormality flag is not "0"; and set the abnormality-determination flag to "1" if the provisional abnormality flag is "0".

11. A valve-timing controller for an internal combustion engine according to claim 10, wherein the abnormality determining means is operative to set the predetermined value from mapped values based on engine operating parameters.

12. A valve-timing controller for an internal combustion engine according to claim 10, wherein the abnormality determining means is operative to:

calculate the term TAC from measured engine speed and intake air quantity parameters when the abnormality-determination flag is "0"; and suppress operation of the variable valve-timing control mechanism when the abnormality-determination flag is "1".

13. A valve-timing controller for an internal combustion engine according to claim 10, wherein the abnormality determining means is operative to:

calculate the term TAC from measured engine speed and intake air quantity parameters when the abnormality-determination flag is "0"; and calculate the term TAC from a map when the abnormality-determination flag is "1" so that the term TAC is smaller in value than if the abnormality-determination flag was "0".

14. A valve-timing controller for an internal combustion engine according to claim 10, wherein the abnormality determining means is operative to:

calculate the term TAC from measured engine speed and intake air quantity parameters;

determine if the abnormality-determination flag is "0"; and calculate the term TAC when the abnormality-determination flag is "1" by subtracting a predetermined compensation value from a mapped TAC value.

15. A method of controlling a variable valve-timing control mechanism that is disposed in a driving-torque transmission system, that transmits driving torque from a driveshaft of an internal combustion engine to a driven shaft to open or close at least one of an air-intake valve or exhaust valve, and that freely rotates relative to either said driveshaft or said driven shaft within a predetermined angular range, comprising the steps of:

detecting responsiveness of said variable valve-timing control mechanism, or of a change in an operating state of said internal combustion engine accompanying operation of said variable valve-timing control mechanism;

detecting an abnormality in said variable valve-timing control mechanism based on responsiveness detected during said step of detecting responsiveness;

determining a present relative angle of rotation term AC between the driving shaft and the driven shaft;

determining a target relative angle of rotation term TAC based on predetermined variables;

determining an angle of rotation deviation term ACD based on the AC term and the TAC term;

determining a deviation in the relative angle of rotation term ACDD based on the present ACD term and a past ACD term; and controlling operation of the valve timing control mechanism based on the above determining steps, and further comprising the steps of:

determining a proportional term DPBP for compensating feedback based on engine speed and the term ACD;

determining a differential deviation term DFBD for compensating feedback based on the engine speed and the term ACDD; and controlling the variable valve timing control mechanism based on the DFBP and DFBD terms.

16. The method of claim 15, further comprising the steps of:

determining if test conditions exist;

determining a responsiveness parameter that indicates a speed of change in the relative angle of rotation; and determining if an operating abnormality exists based on the responsiveness parameter.

17. The method of claim 16, further comprising the steps of:

determining if the responsiveness parameter is less than a predetermined value;

resetting provisional abnormality and abnormality-determination flags to "0" if the responsiveness parameter is not less than the predetermined value;

determining if the provisional abnormality flag is "0" if the responsiveness parameter is less than the predetermined value;

generating a warning signal if the provisional abnormality flag is not "0"; and setting the abnormality-determination flag to "1" if the provisional abnormality flag is "0".

18. The method of claim 17, further comprising the step of setting the predetermined value from mapped values based on engine operating parameters.

19. The method of claim 17, further comprising the steps of:

calculating the term TAC from measured engine speed and intake air quantity parameters when the abnormality-determination flag is "0"; and suppressing operation of the variable valve-timing control mechanism when the abnormality-determination flag is "1".

20. The method of claim 17, further comprising the steps of:

calculating the term TAC from measured engine speed and intake air quantity parameters when the abnormality-determination flag is "0"; and calculating the term TAC from a map when the abnormality-determination flag is "1" so that the term TAC is smaller in value than if the abnormality-determination flag was "0".

21. The method of claim 17, further comprising the steps of:

calculating the term TAC from measured engine speed and intake air quantity parameters;

determining if the abnormality-determination flag is "0"; and calculating the term TAC when the abnormality-determination flag is "1" by subtracting a predetermined compensation value from a mapped TAC value.

* * * * *